United States Patent [19]
Sibbertsen et al.

[11] Patent Number: 5,193,341
[45] Date of Patent: Mar. 16, 1993

[54] ARRANGEMENT FOR REMOVING OXIDIZABLE OR COMBUSTIBLE PARTICLES FROM EXHAUST GASES

[75] Inventors: Walter Sibbertsen; Karl-Heinz Flatow, both of Hamburg, Fed. Rep. of Germany

[73] Assignee: HKK Hanseatisches Kreativ Kontor Gesellschaft für Entwicklung und Vertrieb mbH, Hamburg, Fed. Rep. of Germany

[21] Appl. No.: 646,603

[22] PCT Filed: May 30, 1990

[86] PCT No.: PCT/EP90/00864
§ 371 Date: Feb. 11, 1991
§ 102(e) Date: Feb. 11, 1991

[87] PCT Pub. No.: WO90/15228
PCT Pub. Date: Dec. 13, 1990

[30] Foreign Application Priority Data

Jun. 1, 1989 [DE] Fed. Rep. of Germany ....... 3917888

[51] Int. Cl.$^5$ ............................................. F01N 3/26
[52] U.S. Cl. ......................................... 60/299; 60/303; 60/308; 422/180
[58] Field of Search ............... 60/308, 303, 299, 279, 60/302; 422/180

[56] References Cited

U.S. PATENT DOCUMENTS

| | | | |
|---|---|---|---|
| 2,833,615 | 5/1958 | Kollgaard | 60/310 |
| 3,019,780 | 2/1962 | Nuding | 60/279 |
| 3,494,445 | 2/1970 | Ott | 60/308 |
| 3,566,610 | 3/1971 | Fiore | 60/279 |
| 3,577,728 | 5/1971 | Von Brimer | 60/308 |
| 3,861,142 | 1/1975 | Bose | 60/279 |
| 4,353,208 | 10/1982 | Volker | 60/302 |
| 4,693,078 | 9/1987 | Dettling | 60/297 |

Primary Examiner—Douglas Hart
Attorney, Agent, or Firm—Walter Ottesen

[57] ABSTRACT

The invention relates to a device for removing soot particles from exhaust gases of a diesel engine. To this end, the exhaust pipe (15) of the diesel engine (1) is connected to a vortex tube (2) into which the exhaust gases of the diesel engine flow tangentially. The exhaust gases expand adiabatically as they flow through a diaphragm (4) in the region of the exhaust gas inlet, and are cooled in the process. The exhaust gases swirl helically in the vortex tube (2), and the temperature is raised by approximately 100° C.; that is, incoming gases at a temperature of approximately 500° C. are heated to approximately 600° C. This temperature is sufficient for combustion of the soot particles inside the tube. The exhaust gases leaving the hot end are therefore practically free from soot particles.

7 Claims, 2 Drawing Sheets

ARRANGEMENT FOR REMOVING OXIDIZABLE OR COMBUSTIBLE PARTICLES FROM EXHAUST GASES

FIELD OF THE INVENTION

The invention relates to an arrangement for removing oxidizable or combustible particles such as soot from exhaust gases containing particles of this kind.

BACKGROUND OF THE INVENTION

The most serious exhaust-gas problem of diesel engines is smoke; on the one hand, because of hindering the view on traffic roadways and, on the other hand, because of the characteristic of the smoke to bind other toxic exhaust-gas components such as sulfur oxide and hydrocarbons and to transport the same into the human body. Hot smoke contains significant amounts of soot and occurs because of the incomplete combustion as a consequence of a deficiency of air at high temperatures. The hot smoke occurs at full load or at overload and comprises primarily black soot granules of 0.3 to 0.1 μm.

SUMMARY OF THE INVENTION

The invention has the task to provide an arrangement for removing oxidizable or combustible particles from exhaust gases so that the arrangement can be utilized especially as an afterburner for a diesel engine.

Vortex tubes are known and originate with the works of G. Ranques and R. Hilsch. In vortex tubes, a gas under pressure is injected tangentially and divides to both sides of the tube in a vortical manner and exits through diaphragms at the ends of the tube. In this way, an axial vortical flow is formed. Hot gas exits at one end of the vortex tube because of adiabatic compression. An adiabatic expansion takes place at the other end of the vortex tube by means of the nozzle so that cold gas exits there. An arrangement of this kind combined with a compressed air blower unit in order to blow cold air onto workpieces and is described in DE-OS 36 00 147.

It has been shown in a surprising manner that by tangentially injecting exhaust gases enriched with combustible particles such as soot under a pressure of 0.5 to 10 bar, preferably 5 bar, a vortical air flow is obtained which shows a temperature increase of approximately 100° C. at the outer zones of the air flow compared to the inflowing gas. Since the exhaust gases of diesel engines have a temperature of approximately 500°, a temperature increase to approximately 600° C. can be obtained in the vortex tube which is sufficient to combust the oxidizable soot particles. The combustion takes place because the soot particles receive a high rotational speed due to the tangential inflow in the form of a cyclone effect which hurls the soot particles against the tube wall and, because the soot particles are heated to more than the ignition point for soot as a consequence of the temperature increase. The gases in the center of the tube are cleaned because of the cyclone effect and leave the tube center through the diaphragm. The rest including the waste leaves the tube through the throttle.

To obtain an optimal temperature increase, it is suitable to enclose the vortex tube additionally with an outer thermal insulating layer. Furthermore, it is advantageous for the combustion of soot particles if the inner surface of the tube is coated with a catalyzer.

BRIEF DESCRIPTION OF THE DRAWINGS

In the following, the invention will be explained with reference to the drawings wherein.

DESCRIPTION OF THE PREFERRED EMBODIMENTS OF THE INVENTION

Figure 1:
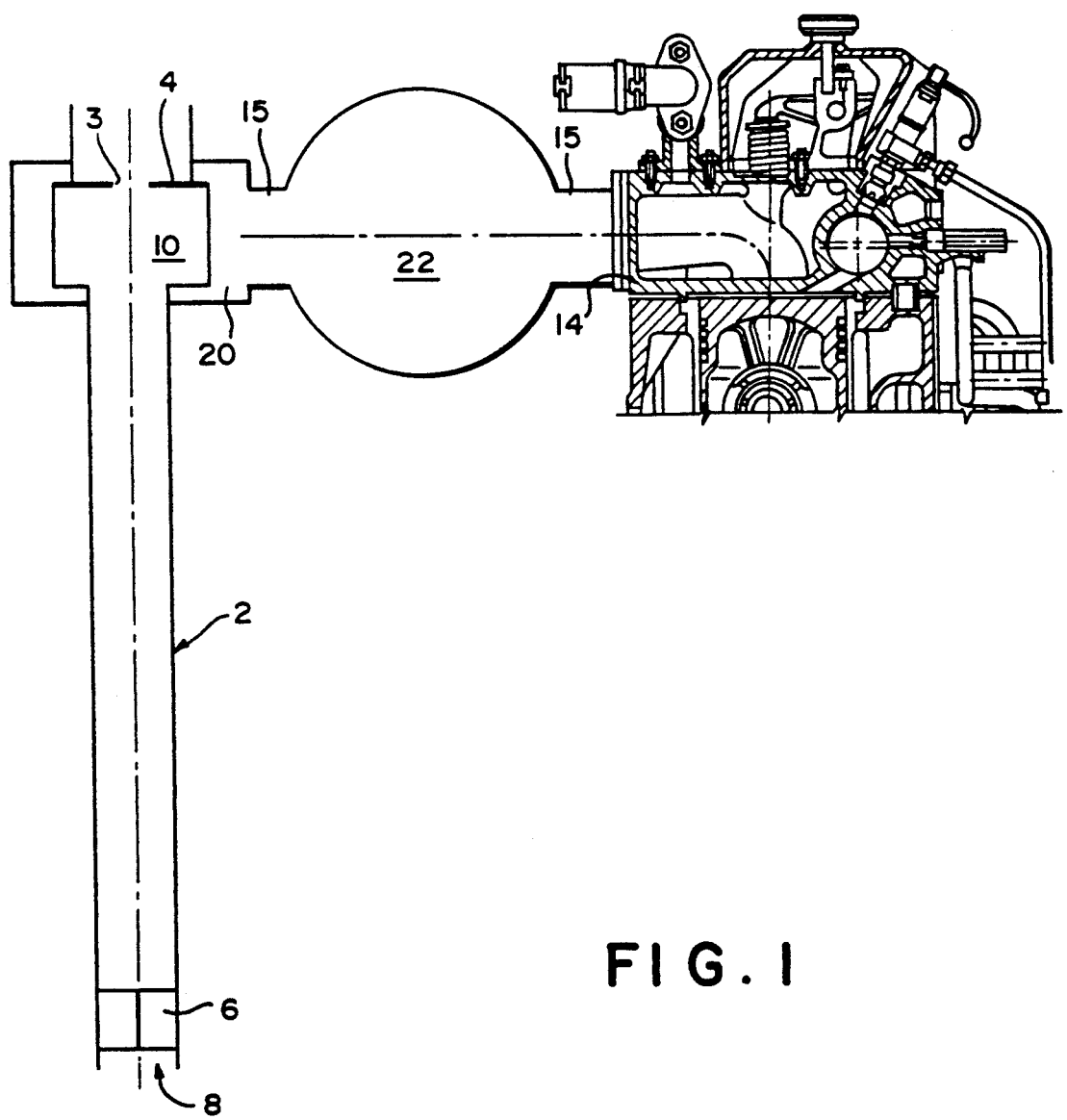
FIG. 1 is a schematic illustration of an embodiment in combination with a diesel engine.

FIG. 1 shows a vortex tube 2 connected to a diesel engine 1. The diesel engine 1 is illustrated only schematically and in section through its cylinder head. The expert recognizes therein the piston, the injection nozzle, the outlet valve and finally the exhaust manifold 14 to which an exhaust pipe 15 is flange connected. The exhaust gas pipe 15 has an attenuation vessel 22 which serves to intercept pressure pulses of the exhaust gases which are pushed out in surges. An attenuating vessel 22 of this kind is however, not always required. Simple experiments of the expert show if the attenuating vessel should be provided in combination with the arrangement according to the invention. Attention is called to the fact that the exhaust gas line 15 with its attenuating vessel 22 is only shown schematically. The end of the exhaust-gas pipe 15 remote from the diesel engine 1 extends into an annular chamber 20 wherein one end of the vortex tube 2 is accommodated. The vortex tube 2 is in this illustration likewise indicated only schematically insofar as it is required for an understanding of its function. Details of the vortex tube 2 can be taken from the FIGS. 2 to 4.

The vortex tube 2 has in general a length of 10 cm to 20 cm and a diameter of 2 cm to 4 cm, preferably 3 cm. In this connection, it is suitable if the ratio of the tube length to the diameter is 10:1 to 20:1 and preferably 15:1. The upper end in FIG. 1 of the vortex tube 2 is accommodated in the annular chamber 20 of the exhaust gas line 15. At this upper end, the vortex tube 2 is provided with a nozzle ring 10 which holds a diaphragm 4 and closes the cross section thereof up to a central opening 3. In the vicinity of the diaphragm 4, the exhaust gases are introduced into the nozzle ring from the exhaust gas line 15 so that the exhaust gases provide for a helical flow which extends over the entire axial length of the vortex tube 2. The end 8 of the vortex tube 2 facing away from the nozzle ring 10 is substantially open and has only a flow stabilizer 6 through which the vortical flow can exit. The flow stabilizer 6 is explained later in combination with FIG. 4.

By means of the adiabatic compression of the exhaust gases in the vortex tube 2, a temperature increase takes place up to approximately 100° C. so that hot exhaust gases exit from the flow stabilizer 6 at the lower end 8 of the vortex tube 2. On the other hand, an adiabatic expansion of the exhaust gases takes place at the diaphragm 4 which leads to a cooling of the gas flow. For an exhaust gas flow of 5 to 10 bar pressure, which is introduced into the nozzle ring 10 with an inlet temperature of +20° C., cold air at +15° C. for a closed throttle can exit at the cold end of the vortex tube and to −40° C. for a partially opened throttle.

Figure 2:
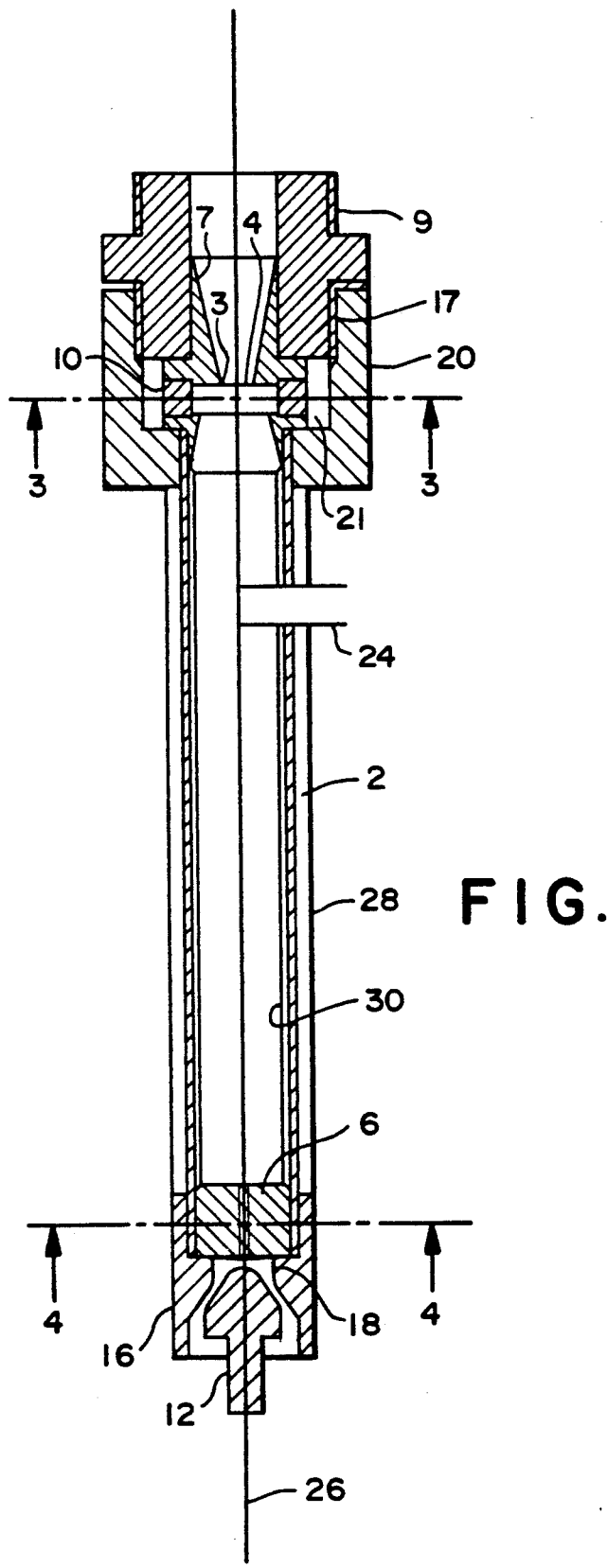
FIG. 2 is a section through a vortex tube.
Figure 3:
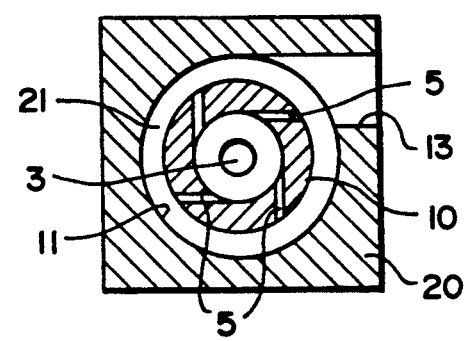
FIG. 3 is a section taken along the line 3—3 through FIG. 2.

FIGS. 2 and 3 show details of the vortex tube 2 of FIG. 1. One recognizes the annular chamber 20 in the upper part which surrounds the cold end of the vortex tube 2. The annular chamber 20 is shown in section in FIG. 3. In the embodiment shown, the annular chamber 20 has a quadratic cross section with an axial bore 11 in which the vortex tube 2 is seated. The annular chamber 20 further has an inlet 13 through which the hot exhaust gases from the diesel engine 1 can flow in. For this purpose, the annular chamber 20 is connected to the exhaust gas pipe in accordance with FIG. 1 and suitably via a screw connection or clamp connection as known. The nozzle ring 10 recognizable in FIGS. 2 and 3 is seated in the ring chamber 20. The nozzle ring 10 has four tangential bores 5 in the illustrated embodiment. The bores 5 pass through the entire wall thickness of the nozzle ring 10. The outer diameter of the nozzle ring 10 is significantly less than the inner diameter of the axial bore 11 of the annular chamber 20 so that this forms an annular chamber 21 which surrounds the nozzle ring 10. Exhaust gases flowing in through the inlet 13 therefore first reach the annular chamber 21 and flow through the bore 5 tangentially into the interior of the vortex tube 2 with its pulse effecting a helical movement along the length of the vortex tube 2. By means of this vortical movement, the exhaust gases and especially the solid particles contained therein such as soot particles are hurled outwardly against the wall of the vortex tube 2. An adiabatic compression then takes place in the interior of the vortex tube 2 which leads to a temperature increase of up to approximately 100° C. If the inflowing diesel exhaust gases have a temperature of approximately 500° C., this results in a temperature of 600° C. in the interior of the vortex tube 2 which is sufficient to combust the soot particles. The combustion takes place also for the reason that normally a sufficiently high oxygen surplus is present in the interior of the vortex tube 2 when utilizing diesel exhaust gases. If this surplus is not sufficient, then additional air supply channels can be provided which lead radially into the interior of the vortex tube 2. One of the additional air supply channels 24 is shown in FIG. 2 and is disposed between the nozzle ring 10 and a throttle piece 12 described below. The air supply channel 24 extends to the longitudinal axis 26 of the vortex tube 2.

In the embodiment shown in FIG. 2, the nozzle ring 10 is held by a diaphragm 4 in that the end face surrounding the diaphragm opening 3 is turned outwardly and thereby forms an annular shoulder on which the nozzle ring 10 lies. The diaphragm 4 furthermore has a cylinder 7 which defines the outer wall of a nozzle expanding conically outwardly. A locking piece 9 is mounted over the cylinder 7 and is screwed into the wall of the annular chamber 20 with an outer winding 17 and the wall of the annular chamber for this purpose naturally has a corresponding inner winding. In this manner, the lock piece 9 centers the diaphragm 4 and the nozzle ring 10 seated on the diaphragm with respect to the vortex tube 2 as well as with respect to the annular chamber 20. In this way, the condition is furthermore obtained that the nozzle ring 10 is directly adjacent to the diaphragm opening 3 so that the exhaust gases flow in directly in neighboring relationship to the diaphragm opening 3. The part of the exhaust gases which exits through the diaphragm opening 3 because of the adiabatic expansion is therefore not first swirled in the vortex tube 2 and compressed adiabatically to a higher temperature. Instead, an adiabatic expansion outwardly takes place immediately.

Figure 4:
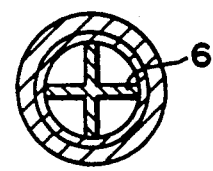
FIG. 4 is a section taken along the line 4—4 through the vortex tube.

In the following, FIG. 4 is explained in combination with the lower end of the vortex tube 2. A flow stabilizer 6 is seated in the lower end of the vortex tube 2 and has the form of a cross. The cross is formed by two mutually perpendicular partition walls having a length corresponding approximately to the diameter of the vortex tube 2. In this way, four axially extending chambers are formed at the lower hot end 8 of the vortex tube and these chambers redirect the helical flow into an axially parallel flow. A throttle support 16 is furthermore seated on the lower end of the vortex tube 2. The throttle support 16 has a throttle opening 18 somewhat reducing the cross section of the vortex tube 2. The throttle opening 18 is an annular shoulder having conically-shaped support faces facing outwardly on which the throttle piece 12 is seated and which can be removed therefrom. The outflowing exhaust gas flow is throttled by means of the movement of the throttle piece 12 in the direction toward the flow stabilizer 6. In this way, the temperature of the exhaust-gas flow exiting from the diaphragm opening 3 can be adjusted.

We claim:

1. An arrangement for removing oxidizable or combustible particles such as soot from an exhaust gas containing said particles, the arrangement comprising:
   an exhaust-gas pipe for conducting said exhaust gas and said exhaust-gas pipe having an output;
   a vortex tube having first and second ends and defining a longitudinal axis;
   bore means receiving said exhaust gas from said output for tangentially injecting said exhaust gas into said vortex tube so as to cause a first part of the gas to move in a helical flow along said tube and undergo an adiabatic compression thereby heating said first part as said first part moves along said tube;
   diaphragm means defining a diaphragm opening and being mounted at said first end of said vortex tube for causing a second part of said exhaust gas to undergo an adiabatic expansion thereby cooling said second part and for conducting said second part in a direction away from said vortex tube through said diaphragm opening;
   said diaphragm means being mounted at said first end of said tube so as to be at a first spacing from said bore means;
   adjustable throttle means disposed at said second end of said vortex tube for adjustably throttling said first part of the exhaust gas flowing out of said vortex tube at said second end thereof; and,
   said adjustable throttle means being mounted at a second spacing from said bore means greater than said first spacing.

2. The arrangement of claim 1, said diaphragm means being positioned relative to said vortex tube so as to cause said diaphragm opening to be centered on said longitudinal axis; and, said bore means including a body seated in said vortex tube and at least one bore formed in said body so as to be arranged tangentially with respect to said tube.

3. The arrangement of claim 2, further comprising an interface structure for interfacing said exhaust-gas pipe and said vortex tube; said interface structure and said body conjointly defining an annular chamber surrounding said vortex tube and communicating with said output of said exhaust-gas pipe; said body defining a nozzle ring having a plurality of said bores formed therein;

and, each of said bores being tangentially directed into said vortex tube to generate said helical flow.

4. An arrangement for removing oxidizable or combustible particles such as soot from an exhaust gas containing said particles, the arrangement comprising:
   an exhaust-gas pipe for conducting said exhaust gas and said exhaust-gas pipe having an output;
   a vortex tube having first and second ends and defining a longitudinal axis;
   bore means receiving said exhaust gas from said output for tangentially injecting said exhaust gas into said vortex tube so as to cause the gas to move in a helical flow along said tube;
   a diaphragm mounted at said first end of said tube so as to be at a first spacing from said bore means;
   said diaphragm having an opening centered on said longitudinal axis;
   adjustable throttle means disposed at said second end of said vortex tube for adjustably throttling the exhaust gas flowing out of said vortex tube;
   said adjustable throttle means being mounted at a second spacing from said bore means greater than said first spacing;
   said bore means including a body seated in said vortex tube and at least one bore formed in said body so as to be arranged tangentially with respect to said tube;
   an interface structure for interfacing said exhaust-gas pipe and said vortex tube; said interface structure and said body conjointly defining an annular chamber surrounding said vortex tube and communicating with said output of said exhaust-gas pipe; said body defining a nozzle ring having a plurality of said bores formed therein; and, each of said bores being tangentially directed into said vortex tube to generate said helical flow;
   at least one air supply channel extending radially into said vortex tube to the region of said axis; and,
   air supply channel being disposed between said nozzle ring and said throttle means.

5. The arrangement of claim 3, further comprising a thermal insulating layer enclosing said vortex tube.

6. The arrangement of claim 2, said vortex tube having an inner wall surface and further comprising an exhaust gas catalyzer coating applied to said inner wall surface.

7. The arrangement of claim 2, further comprising an attenuation vessel connected into said exhaust-gas pipe.

* * * * *

UNITED STATES PATENT AND TRADEMARK OFFICE
CERTIFICATE OF CORRECTION

PATENT NO. : 5,193,341
DATED : March 16, 1993
INVENTOR(S) : Walter Sibbertsen, et al It is certified that error appears in the above-indentified patent and that said Letters Patent is hereby corrected as shown below:

Column 1, line 41: between "kind" and "combined", insert --is--.

Column 2, line 24: between "is" and "however", insert --,--.

Column 4, between lines 21 and 22: insert --The outer wall of the vortex tube 2 can be surrounded by a thermally insulating layer 28 so that the temperature increase of approximately 100°C reliably takes place. Furthermore, it is advantageous for the combustion of soot particles if the inner surface of the tube is coated with a catalyzer layer 30.--

Column 6, line 15: before "air", please insert --said--.

Signed and Sealed this

Eighth Day of February, 1994

Attest:

BRUCE LEHMAN

Attesting Officer

Commissioner of Patents and Trademarks